United States Patent [19]

Zinner

[11] 4,011,050
[45] Mar. 8, 1977

[54] CUTTING-OFF TOOL

[76] Inventor: Karl Zinner, Helenenstrasse 18, 8500 Nuremberg, Germany

[22] Filed: Nov. 3, 1975

[21] Appl. No.: 627,845

Related U.S. Application Data

[63] Continuation of Ser. No. 478,670, June 12, 1974.

[30] Foreign Application Priority Data

Jan. 30, 1974 Germany ............................ 2404302

[52] U.S. Cl. .................................. 29/96; 29/95 R
[51] Int. Cl.² ........................................ B26D 1/00
[58] Field of Search ................................ 29/96, 95

[56] References Cited

UNITED STATES PATENTS

| | | | |
|---|---|---|---|
| 1,776,335 | 9/1930 | Rauzieres | 29/96 |
| 2,679,679 | 6/1954 | Metzler | 29/95 |
| 2,688,791 | 9/1954 | Luers et al. | 29/95 |
| 2,891,300 | 6/1959 | Shepard | 29/95 |
| 2,964,833 | 12/1960 | Novkov | 29/95 |
| 3,136,031 | 6/1964 | Cassidy | 29/97 |
| 3,140,627 | 7/1964 | Walby | 29/95 |
| 3,205,557 | 9/1965 | Frommelt et al. | 29/96 |
| 3,518,737 | 7/1970 | Hood | 29/96 |
| 3,557,417 | 1/1971 | Kollar | 29/96 |
| 3,780,408 | 12/1973 | McCreery | 29/96 |

*Primary Examiner*—Leonidas Vlachos
*Attorney, Agent, or Firm*—Frank J. Jordan

[57] ABSTRACT

A cutting-off or parting tool includes a holder detachably mounted on a support and a cutting bit mounted on the holder by means of a clamping plate. The lower and upper portions of the cutting bit are V-shaped and accommodated in corresponding V-shaped grooves in the holder and clamping plate respectively, thereby providing a secure mounting for the cutting bit.

7 Claims, 7 Drawing Figures

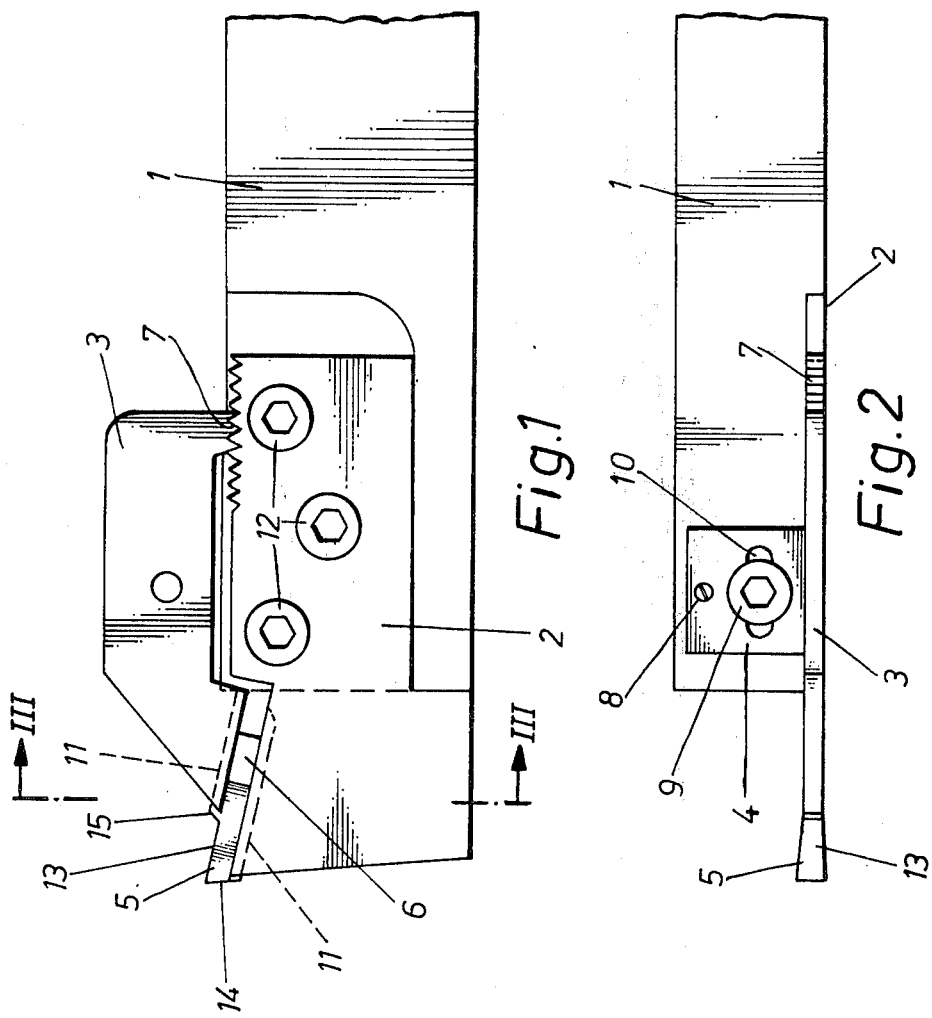

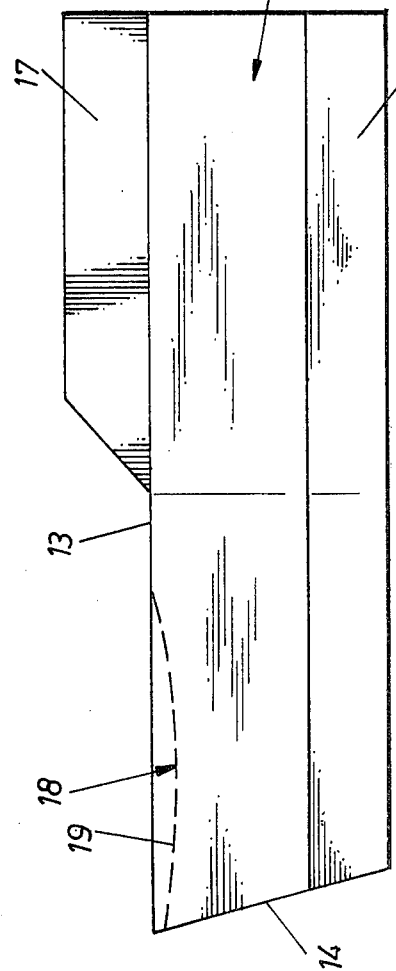
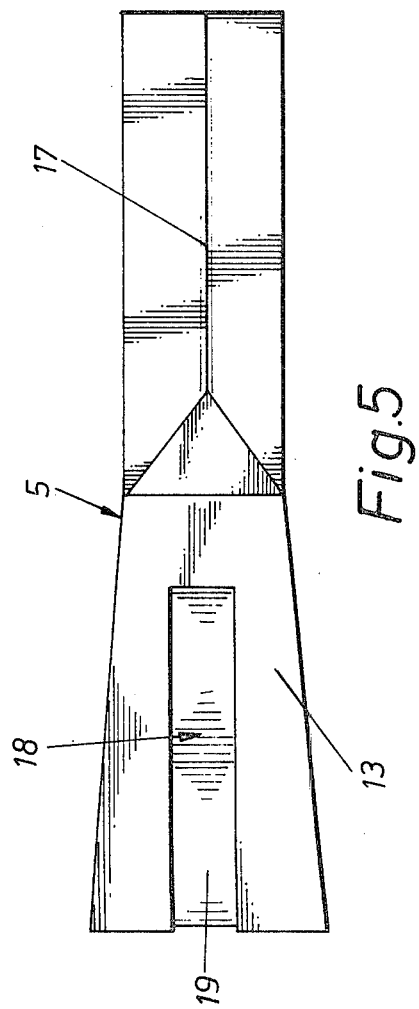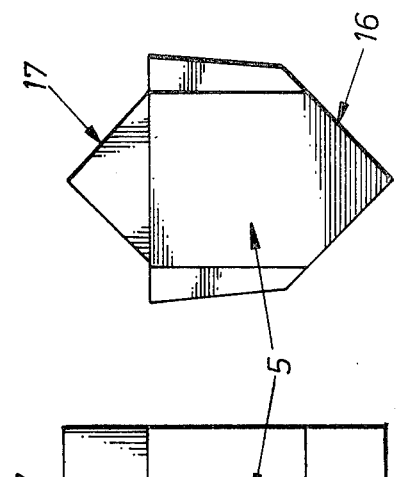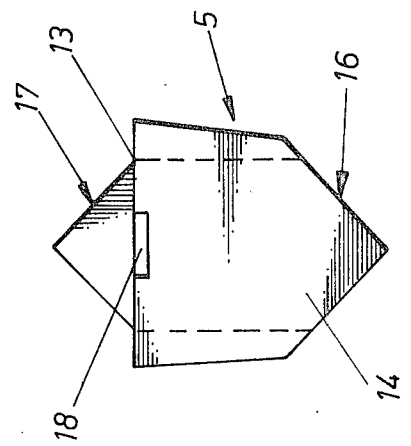

CUTTING-OFF TOOL

This is a continuation, of application Ser. No. 478,670, filed June 12, 1974.

BACKGROUND OF THE INVENTION

This invention relates to a cutting-off tool of the type having a support, a relatively thin or leaf-shaped knife holder arranged datachably upon a lateral surface of the support, a cutting bit which is disposed replaceably at the front end of the knife holder in a V-shaped groove, and a relatively thin or leaf-shaped clamping plate movable against the knife holder in its longitudinal direction, the clamping plate being supported by the action of a set screw with its front end disposed upon the upper side of the cutting tool and being supported with its posterior end upon the knife holder.

This well known type of a cutting-off tool is not practical because experience has shown that even gentle pressing of the clamping plate upon the upper surface of the cutting bit at relatively low lateral pressure upon the clamping plate or the thin knife holder causes them to deform in such a way that the cutting bit jumps out of the V-shaped bearing groove of the knife holder. This construction is completely unsuitable for practical use because during the use of such cutting-off tools the chips which have been removed, and which are distributed within the recessed grooves, and also because of unavoidable motions of the workpiece, both subject the cutting bit to such lateral pressures that are by far larger than needed to deform the clamping plate or the knife holder so that the cutting bit jumps out of the groove.

Traditionally such difficulties were heretofore alleviated by forming a narrow, long rod and by soldering or otherwise securing the cutting bit to a respective extension part. The length of this rod was chosen to be longer than the length of the superior clamping plate so that it was possible to solidly clamp the cutting bit. This technique also served to counteract the thrust or backpressure of the cutting action against the cutting bit.

The disadvantages of the latter construction are the wasted amount of time needed for the soldering and also the waste of material required for the longitudinal, elongated cutting bit. Additionally it may be noted, that in this construction the bevel which serves to reject the chips is situated close to the upper part of the clamp. Thus the anterior edge of the clamp may be easily damaged by the chips eventually leading to imperfect fastening of the cutting bit after prolonged use. That would lead to a premature replacement of the upper clamping plate, thus again increasing the cost of the arrangement.

Accordingly, an object of the present invention is to overcome the disadvantage of these known prior art arrangements and to provide a cutting-off tool which guarantees an absolutely rigid locking of the cutting bit even under the most unfavorable working conditions and which allows an exchange of the cutting bit with as little effort as possible, thereby generally obviating repairs.

The present invention achieves this objective by shaping the cutting bit prismatically upon the upper plane which acts upon and engages the clamping plate, such prismatic surface mating with a respective V-shaped bearing groove, and by providing that the cutting bit is braced against the backpressure or thrust of the cutting by a thrust block which is solidly connected to the clamping plate. It has been found that this prismatic construction of the cutting bit solidly locks the cutting bit onto the cutting-off tool at minimal clamping pressure. This locking action prevents the cutting bit from jumping out of its holder even when very strong lateral forces impinge upon the whole tool, or when the tool is completely bent out of shape.

In a further embodiment of the present invention the clamping plate is provided with a support which is capable of being secured to the clamping plate by the thrust of a screw whereby it is furthermore extremely advantageous that the clamping plate and the knife holder bear respectively at their posterior ends against mating serrations whereby the clamping plate may be solidly locked in predetermined positions relative to the knife holder.

In a further embodiment of the present invention the clamping plate may be protected against the removed chips by providing a rejecting bevel between the working part of the cutting bit and the fastened part of the cutting bit.

The angle of the bearing prisms of the cutting bit and the V-shaped holding grooves or bearing grooves may be preferably 90°. The choice of a 90° angle simplifies the manufacture considerably. A considerable problem encountered with cutting-off tools and other tools such as grooving tools using cutting bits is that a satisfactory discharge of chips cannot be assured at cutting depths of more than 15 mm (⅝ inch). The jamming of chips in the indented groove impedes further cutting. Thus, hitherto existing tools were only capable of cutting deep and narrow grooves with great difficulties. This problem is even more annoying than the difficulties engendered with the mounting or fastening of the cutting bit.

Accordingly, in a further embodiment of the present invention the chips are actively shaped in such a way that they leave the groove easily so that the difficulties of the mounting or fastening of the cutting bit as regards the reaching of greater groove depths may be counteracted. This may be advantageously effected by grinding into the cutting surface of the cutting bit which serves as the guiding surface for the chips, a longitudinal groove which extends from the front edge or plane and which leads steplessly towards the rear of the guiding surface. This longitudinal groove is cut into hard metal (carbide) cutting bits with a diamond wheel and into high speed bits with a Borazon (boride) wheel. The longitudinal groove breaks the chip which was cut off the workpiece with the cutting bit into three parts according to the specific material and also according to a function of the chip angle of the cutting bit. The longitudinal groove may also shape the chip in such a way that the chip contracts, thus becoming narrower than the width of the groove. In any case the chip becomes narrower than the groove so that the chip or the several narrower parts of said chip may easily drop or pass out of the groove.

According to another embodiment of the present invention the longitudinal groove prepared by grinding may vary in diameter, and provision may be made so that the cutting plane and the bottom of the longitudinal groove exhibit different angles of chipping, preferably in such a way that the bottom of the longitudinal groove is concavely shaped in concordance with the rounding of the grinding wheel which was used to make the groove.

A cutting-off tool is already well known where near to its cutting edge a spherical indentation prepared by a sintering process is provided but such a construction of a cutting-off tool does not allow adaptability or accommodation to various working conditions so that the depth, the width, and the angle of chipping of this indentation might cause a crumbling of the removed chip or at least a shrinking of the chip. Particularly such merely spherical indentation is not capable of guiding the chips like the heretofore described longitudinal groove, a fact which is of great importance for neat guiding of chips, free of jamming, when large depths of recesses are desired. Here it should also be mentioned that cutting bits with spherical indentations, in contradistinction to the workpieces of the present invention, cannot be sharpened by grinding, and they must be thrown away once the cutting edges become dull.

SUMMARY OF THE INVENTION

A cutting-off tool includes a holder detachably mounted on a support and a cutting bit mounted on the holder by a clamping plate. The holder has a V-shaped groove in which a V-shaped bottom part of the cutting bit is accommodated. The clamping plate also has a V-shaped groove on a front end portion in which a V-shaped top part of the cutting bit is accommodated. The clamping plate has a rear end portion engaging the holder and means are provided for securing the clamping plate to the holder.

BRIEF DESCRIPTION OF THE DRAWINGS

FIG. 1 is an elevational view of a cutting-off tool according to one embodiment of the present invention.

FIG. 2 is a plan view of the cutting-off tool shown in FIG. 1.

FIG. 3 is a sectional view taken along the line III—III in FIG. 1.

FIG. 4 is an enlarged elevational view of an alternate cutting bit for a cutting-off tool according to the present invention.

FIG. 5 is a plan view of the cutting bit shown in FIG. 4.

FIG. 6 is a rear view of the cutting bit shown in FIG. 4.

FIG. 7 is a front view of the cutting bit shown in FIG. 4.

DESCRIPTION OF THE PREFERRED EMBODIMENTS

The cutting-off tool shown in FIGS. 1, 2, and 3 consists of a support 1, a knife holder 2 which is connected rigidly with the support 1 by internal screws, and a clamping plate 3 having a lateral support part 4. A cutting bit 5 is mounted by compression between the leaf-shaped or relatively thin knife holder 2 and the clamping plate 3. The clamping plate 3 is rigidly connected to a thrust block 6 in order to securely hold the cutting bit 5 against the thrust exerted by the cutting action. The clamping plate 3 and the leaf-shaped knife holder 2 are provided at their respective posterior ends with mating serrations 7 in order to provide for securely mounting the clamping plate 3 in various longitudinal positions relative to the leaf-shaped knife holder 2, the clamping plate 3 being capable of being pressed more or less strongly from above towards the cutting bit 5 by the aid of screws 8 and 9 which traverse the lateral supporting part 4. The attachment screw 9 is disposed for that purpose in an oblong hole 10 in the supporting part 4.

V-shaped guideways 11 are cut into the clamping plate 3 and also in the leaf-shaped knife holder 2, such guideways 11 mating respectively with the prismatically shaped upper and lower surfaces of the cutting bit 5. Interior hexagonal screws 12 rigidly fasten the knife holder 2 to the support 1.

The cutting bit 5 may be readily fabricated from a semifinished prismatic bar in which the latter has a rectangular cross section. The basic shape of the cutting bit 5 which fits into the V-shaped guideways 11 is easily prepared by grinding off two opposite edges. Then only cutting plane 13 and freeplane 14 have to be prepared by grinding. The transition from the cutting plane 14 to the clamped part of the cutting bit 5 is provided with an inclined bevel or chamfer 15 for the ejected chip and having for example an angle of 40° relative to the vertical. The clamping plate 3 will not be worn or eroded by the ejected chips because the rejecting inclined bevel of chamfer 15 is arranged beyond the clamped part of the cutting bit 5.

The development of a cutting-off tool according to the present invention allows the advantageous use of small cutting bits which use only little material and thus may be prepared for example as an already finished, sintered part, and therefore relatively low in price.

In the variation of the cutting bit 5 of the present invention, as shown in FIGS. 4 to 7, bottom side 16 and the rear clamping top side part 17 are shaped prismatically with the clamping part 17 bordering on the cutting plane 13. The bottom side 16 and the clamping part 17 mate, as shown in FIGS. 1, 2, and 3, with the respective V-shaped holder guideways 11 of the knife holder 2 and the clamping plate 3. Thus the cutting bit as described is held exceedingly well by the above described arrangement even at very low clamping pressures. This advantageous locking of the cutting bit 5 allows the shaping of deeper grooves than any other clamping arrangement.

In the variation of the present invention shown in FIGS. 4 to 7, in order to further increase the depth of a cut groove, a longitudinally extending groove 18 is cut into the chip guiding cutting plane 13 of the cutting bit 5, such groove 18 beginning at the front freeplane 14. The groove 18 may be cut into hard metal (e.g. carbide) cutting bits with a diamond wheel, and into high speed steel bits with a Borazon (boride) wheel. The bottom 19 of the longitudinal groove 18 has a concave configuration in the example shown. Thus the groove 18 exhibits a chip angle differing from the chip angle of the cutting plane 13, such cutting plane 13 having in the illustrated example practically an angle of 0°. Coincidentally, this concave configuration of the bottom 19 of the longitudinal groove 18 ensures that the bottom 19 of the longitudinal groove 18 leads smoothly at the posterior end of the longitudinal groove 18 into the cutting plane 13 so that the function of the cutting plane as a chip guiding plane is not impaired. Due to this longitudinal groove 18 the chip disintegrates on turning either at once into three small chip parts which cannot get jammed within the recess or groove of the workpiece, or a chip results which has at its center an impressed groove or furrow which enables the chip to contract and thus have a width narrower than the width of the cutting bit and resulting in a narrower width than the recess or groove in the workpiece.

The invention is not restricted to the examples shown in the drawings. Particularly, a cutting bit with a longitudinal groove 18 in the cutting plane 13 does not have to be provided with the prismatic planes 16 and 17 as shown in the embodiments of FIGS. 4 to 7. It is also possible to make use of the longitudinal groove 18 which, according to the present invention, serves in the formation of the chips when cutting bits are used for other cutting-off tools, even when the cutting-off tools do not make use of the advantageous prismatic mounting of the cutting bit between clamping plates, such clamping plates being provided with V-shaped mounting grooves.

While the invention has been described by means of specific examples and in specific embodiments, it is not intended to be limited thereto, for obvious modifications will occur to those skilled in the art without departing from the spirit and scope of the invention.

What is claimed is:

1. A cutting-off tool for cutting a workpiece, comprising a support, a holder detachably mounted on one side of said support, said holder having a V-shaped groove, a cutting bit having a V-shaped bottom part mating with said V-shaped groove in said holder, said cutting bit being made of a single piece of material of sufficient hardness to effect cutting of said workpiece, a clamping plate having one end portion engaging an upper side of said cutting bit and another end portion engaging said holder, securing means detachably holding said clamping plate to said support, said one end portion of said clamping plate having a V-shaped groove, said cutting bit having a front portion and a rear portion, said cutting bit having at its rear portion a V-shaped top part mating with said V-shaped groove in said clamping plate, said cutting bit having at its front portion a chip-guiding surface having a front longitudinal end coincident with the front longitudinal end of said cutting bit and a rear longitudinal end located at the junction between said front and rear portions, an elongated groove in said chip-guiding surface beginning at said front of said chip-guiding surface and extending toward the rear end portion of said chip-guiding surface, said elongated groove terminating at a position spaced from said juncture of said front and rear portions to provide a generally flat and ungrooved rear chip-guiding surface section disposed between the rear end of said groove and said juncture, the width of said elongated groove being less than the width of said chip-guiding surface, whereby lateral portions of said chip-guiding surface extend on both sides of said elongated groove.

2. A cutting-off tool according to claim 1 wherein the bottom of said elongated groove has a rear section which progressively slopes upwardly along its longitudinal axis toward its rear longitudinal end.

3. A cutting-off tool according to claim 1 wherein the bottom of said groove has a concave configuration.

4. A cutting-off tool according to claim 1 wherein the bottom of said groove has a configuration representing a portion of a cylinder with the longitudinal axis of said cylinder being perpendicular to the longitudinal axis of said cutting bit.

5. A cutting-off tool according to claim 1 wherein said chip-guiding surface is generally flat.

6. A cutting-off tool according to claim 1 wherein said lateral portions are generally flat and lie in a common plane with each other and with said flat and ungrooved rear chip-guiding surface section.

7. A cutting-off tool according to claim 1 wherein said cutting bit has an inclined bevel at said juncture of said front and rear portions, said inclined bevel sloping upwardly and rearwardly relative to the longitudinal axis of said cutting bit, said inclined bevel defining the front end of said inverted V-shaped top portion of said cutting bit.

* * * * *